United States Patent

Schieferdecker et al.

[11] Patent Number: 5,826,982
[45] Date of Patent: Oct. 27, 1998

[54] TEMPERATURE SENSING MODULE

[75] Inventors: Jörg Schieferdecker, Wiesbaden; Reiner Quad, Taunusstein; Mischa Schulze, Strausberg, all of Germany

[73] Assignee: Heimann Optoelectronics GmbH, Wiesbaden, Germany

[21] Appl. No.: 617,847
[22] PCT Filed: Sep. 12, 1994
[86] PCT No.: PCT/EP94/03041
 § 371 Date: Jun. 14, 1996
 § 102(e) Date: Jun. 14, 1996
[87] PCT Pub. No.: WO95/08251
 PCT Pub. Date: Mar. 23, 1995

[30] Foreign Application Priority Data

Sep. 16, 1993 [DE] Germany ............. 43 31 574.7

[51] Int. Cl.⁶ .............. G01K 13/00; G01J 5/08; G01J 5/16
[52] U.S. Cl. .......... 374/149; 374/130; 374/133; 219/710; 219/494
[58] Field of Search .............. 374/149, 133, 374/129, 130; 219/710, 494

[56] References Cited

U.S. PATENT DOCUMENTS

| | | | |
|---|---|---|---|
| 2,869,369 | 1/1959 | Howell | 374/133 |
| 3,449,121 | 6/1969 | Astheimer . | |
| 4,286,134 | 8/1981 | Nakata et al. | 219/10.55 |
| 4,301,682 | 11/1981 | Everest | 374/133 |
| 4,431,306 | 2/1984 | Estey et al. | 356/216 |
| 4,527,896 | 7/1985 | Irani et al. | 374/133 |
| 4,568,201 | 2/1986 | Noda | 374/128 |
| 4,659,234 | 4/1987 | Brouwer et al. | 374/121 |
| 4,722,612 | 2/1988 | Junkert et al. | 374/133 |
| 4,750,139 | 6/1988 | Dils | 374/133 |
| 4,955,727 | 9/1990 | Weiss | 374/133 |
| 5,017,019 | 5/1991 | Pompei | 374/133 |
| 5,061,084 | 10/1991 | Thompson et al. | 374/133 |
| 5,150,969 | 9/1992 | Goldberg et al. | 374/128 |
| 5,360,966 | 11/1994 | Noda et al. | 219/710 |
| 5,589,094 | 12/1996 | Bu | 374/149 |

FOREIGN PATENT DOCUMENTS

| | | | |
|---|---|---|---|
| 0015710 A1 | 9/1980 | European Pat. Off. . | |
| 0098402 | 1/1984 | European Pat. Off. | 374/133 |
| 2312164 | 12/1976 | France . | |
| 2621457 C3 | 12/1976 | Germany . | |
| 3924250 A1 | 2/1991 | Germany . | |
| 0116230 | 9/1980 | Japan | 374/149 |
| 1589079 | 8/1990 | U.S.S.R. | 374/133 |
| 1226540 | 3/1971 | United Kingdom | 374/133 |
| 2185568 | 2/1987 | United Kingdom . | |
| WO 92/02793 | 2/1992 | WIPO . | |
| WO 93/10426 | 5/1993 | WIPO . | |

OTHER PUBLICATIONS

Patent Abstracts of Japan, vol. 7, No. 256, (p. 236) Nov. 1983, JP, A 58–140 619, Chino Seisakusho K.K.
Patent Abstracts of Japan, vol. 4, No. 70, (p. 12) (552) May 1980, JP A 55–037 917, Tokyo Seikou K.K.
Patent Abstracts of Japan, vol. 15, No. 144, (p. 1189) Apr. 1991, JP A 03 020 690, Siemens, "Strahiungspyrometer Zun Messen hoher und tiefer Temperaturen".

Primary Examiner—Diego F. F. Gutierrez
Attorney, Agent, or Firm—Perman & Green, LLP

[57] ABSTRACT

The present invention concerns a sensor module with a hollow mirror (3) at whose focal point a sensor element (4) has been arranged whose output signal is compared with a reference signal and is transformed into a temperature signal in an evaluation circuit (15). The sensor module has a thermopile (6) in whose immediate vicinity a temperature reference element (5) has been arranged; a first pre-amplifier (8, 9), that is capable of being calibrated, amplifies the output signal from the thermopile (6); a second pre-amplifier (10–13) amplifies the output signal from the temperature reference element (5); and a third pre-amplifier (14) is connected into the circuit in the form of a difference amplifier and forms the difference in signal between the outputs from the first pre-amplifier (8, 9) and the second pre-amplifier (10–13).

11 Claims, 3 Drawing Sheets

TEMPERATURE SENSING MODULE

BACKGROUND OF THE INVENTION

The present invention concerns a temperature-compensated sensor module, especially one for registering infrared radiation, in order to measure the temperature in domestic electrical devices. Such a sensor module of the prior art has a hollow mirror with a focal point at which is located a sensor element of which an output signal is compared with a reference signal and is transformed into a temperature signal in an evaluation circuit, such a sensor module being shown, by way of example, in DE-38 43 947 C1.

The domestic device that is described there is a toaster that has been equipped with an infrared detector whose output signal is compared with a target value via a comparator. The device is switched off in the event that the target value is exceeded. The measurement accuracy of this arrangement varies markedly with the ambient temperature that prevails at the location of usage of the infrared detector. In order to increase the measurement accuracy, the infrared detector would have to be thermally insulated from the ambient temperature variations and this is technically expensive and time-consuming.

A heating/boiling device is known from EP-15 710 D1, especially a microwave oven, with a sensor module that preferably has a pyroelectric IR detector onto which infrared radiation, that emanates from the article that is being cooked (i.e. the object that is being measured), is imaged via an input window—that is termed a "peep hole"—a chopper and a hollow mirror and then through a cylindrical measurement tube with a length of approximately 150 mm and a parabolic mirror that is arranged at the end of the measurement tube. The detector and the parabolic mirror have the same optical axis; as a result of this, the central area of the radiation, that is to be measured, is blocked off. In addition, a motor and a light box are required for the chopper. Moreover, mechanical devices with a separate drive are needed in order to prevent the penetration of steam into the measurement channel of the infrared detector, whereby a shutter has been arranged at the entrance to the measurement tube that closes the measurement tube after each measurement. In addition, a heating element is proposed in order to heat the hollow mirror in a defined manner. In total, this sensor module is constructed in a very expensive manner and is prone to malfunctioning and is cost-intensive as a result of the plurality of its components, especially its mechanically driven components.

A further infrared detector arrangement in a microwave oven is known from DE-26 21 457 C3. In the case of this solution, the infrared radiation that originates from several locations of the article, that is being cooked, is registered sequentially. A pyroelectric detector is again used in combination with a chopper arrangement that consists of two shutter diaphragms that rotate at different speeds, whereby the shutter diaphragms have several holes.

This detector arrangement does not have optical focussing components (lenses or mirrors) in order to restrict the visual angle. Instead of this, various locations of the cooking zone are sensed through the holes that are applied to the second disk. The microwave oven is switched off when the highest temperature occurs.

This application is not suitable for small or lengthy objects, that are to be measured, since these do not cover a large portion of the cooking zone. In addition, further sources of error are possible as a result of the feature that, after several heating processes using a higher temperature, the surroundings of the cooking zone can be "hotter" than the article itself that is being cooked. Additional sources of error can arise via the inherent and reflected radiation from the rotating disks.

The detector arrangement is relatively expensive and is prone to malfunctioning as a result, in particular, of the two moving parts that are driven at different speeds.

SUMMARY OF THE INVENTION

The task that forms the basis of the present invention is to propose a sensor module, especially for the contact-less measurement of temperature via the measurement of infrared radiation, whereby the module is usable over a large range of ambient temperatures with a high measurement accuracy, and possesses no moving parts and is usable without re-calibration upon exchanging it for another unit.

The basic idea of the present invention is to arrange a thermopile, and a temperature reference element in the immediate vicinity of one another, and to suitably pre-amplify the signals from the thermopile and the temperature reference element, in each case, in order, subsequently, to derive a control signal or, as the case may be, a temperature signal from the difference in these signals.

A preferred usage possibility for the sensor module in accordance with the invention resides in its use in domestic devices such as, for example, microwave ovens, ovens for baking, etc. However, the use of the sensor module is not restricted to the area of domestic devices but also comprises, rather, every measurement of surface temperature without making contact with subject matter under observation, for example in ovens and machines, in the industrial manufacturing area, and in process monitoring or, as the case may be, process control.

The ability to exchange the sensor module without calibration of the device and a high measurement accuracy over a wide ambient temperature range of the module are achieved by the features:

that a temperature reference element with known characteristics (preferably a thermistor or PT100) is located in the immediate vicinity of the "cold" contacts of the thermopile, preferably in its housing;

that amplification by the pre-amplifier in order to pre-amplify the thermopile signal is set up in such a way in a calibration step prior to incorporation into the device that the permissible variations in the sensitivity of the thermopile of typically a few multiples of 10%, that are usually present, are compensated;

that the transmission region of the second infrared filter is larger than that of the first infrared filter at the thermopile sensor, as a result of which the permissible variations in the transmission region of the second IR filter do not have any effect on the measurement accuracy after exchange of the sensor module; and that the characteristic temperature line of the compensated output signal from the sensor module is very precisely reproducible because of pre-calibration of the amplification of the sensor and the known characteristic line of the temperature reference element.

BRIEF DESCRIPTION OF THE DRAWINGS

In the following sections, the invention will be elucidated in more detail on the basis of the description of an example of an embodiment with reference being made to the drawings. The following aspects are shown therein.

DETAILED DESCRIPTION OF THE INVENTION

Figure 1:
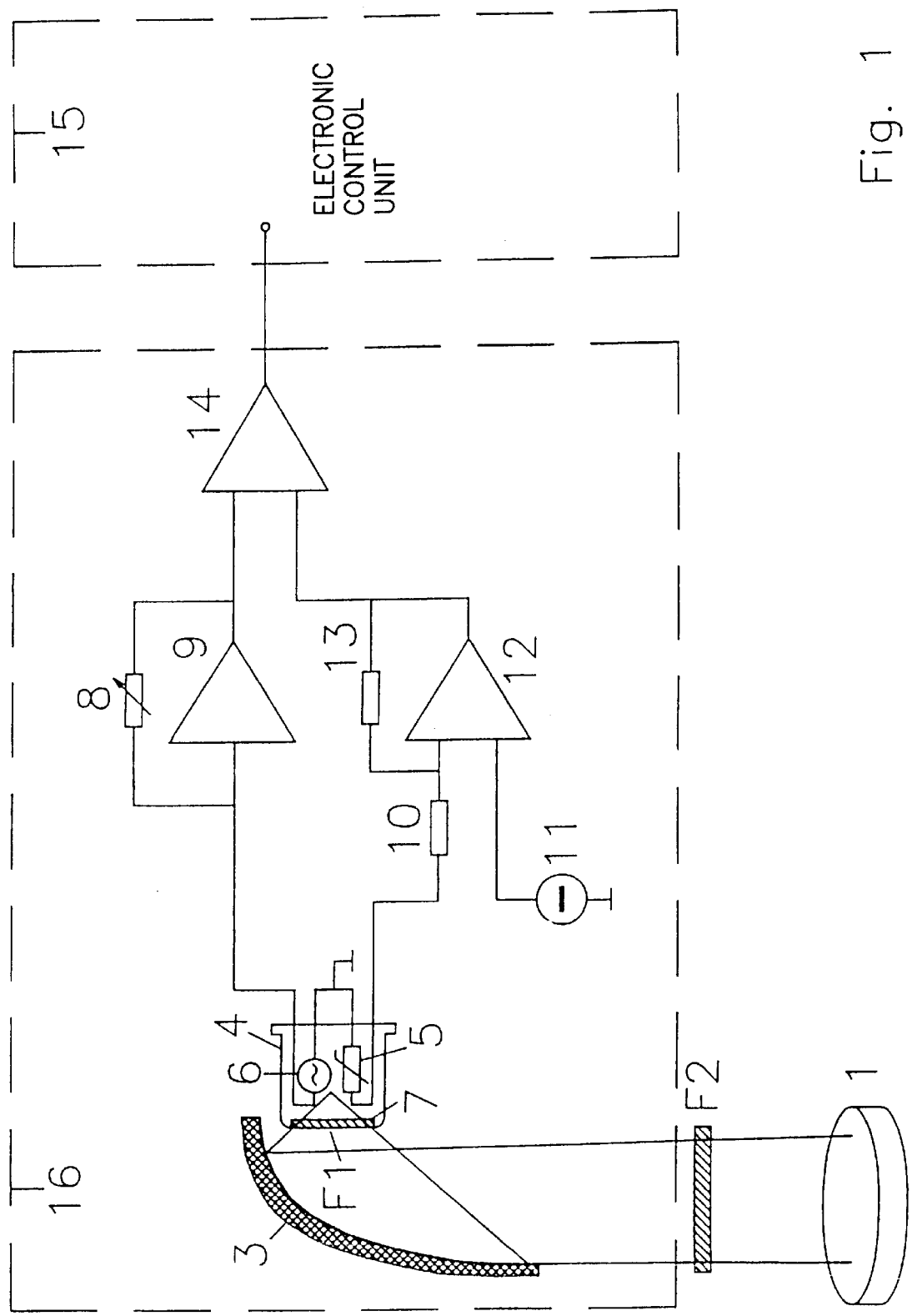
FIG. 1 shows a block circuit diagram of the sensor module in accordance with the invention.

FIG. 1 schematically shows the assembly of the sensor module in accordance with the invention. One can see an object 1, that is to be measured, from which infrared radiation is fed into a first element 16 of the sensor module via an infrared filter F2. Inside the element 16, the infrared radiation is focussed via a parabolic mirror 3 and is deflected by 90°. A thermopile 6 is located at the focal point of the focussed infrared beam. This is arranged in a housing 4 together with a temperature reference element 5. The infrared light beam enters the housing through a filter F1 (7). The optical transmission region of the filter F1, that lets..light through, is selected in such a way that it lies within the optical transmission region, that lets light through, of the filter F2, whereby the optical transmission region of the filter F2 is somewhat larger than that of the filter F1. As a result, the situation is reached in which, on exchanging the element 16, measurement errors are not produced in regard to losing light intensity that is incident on the sensor because the filtering regions of the filters F1 and F2 merely overlap partially and non-reproducibly.

The output from the thermopile 6 is connected to the input to a pre-amplifier 9, whereby the pre-amplifier amplifies at an amplification factor that is capable of being calibrated and that is represented by a counter-coupling resistance 8. The temperature reference element 5—a thermistor in this case—generates an input signal for the pre-amplifier 12 that converts its output signal into a correction signal that is dependent on the ambient temperature. This takes place next to the thermistor 5 and the operation amplifier 12 via the resistances 10 and 13 and the potential reference 11. As a result of [the appropriate] selection of the resistance 10 and 11, the thermistor 5 and the potential reference 11, one defines the temperature range in which a small measurement error arises in the event of ambient temperature variations. In principle, other circuit variants are also possible for the production of the correction signal. For the concrete assembly of the device, it is sufficient to stipulate, on one single occasion, the values of the thermistor 5, the resistances 10 and 13 and the potential reference 11. They can thus be maintained in the case of large numbers of items. Variations in the sensitivity of the thermopile 6, including the filter characteristics of the first infrared filter 7, merely have to be pre-calibrated by calibrating the amplification of the pre-amplifier 9 via the variable resistance 8. The calibration of the amplification can be achieved, for example, by means of laser trimming of the resistances or by short circuiting or, as the case may be, selecting parallel or serial compensation resistances. The temperature compensation signal is drawn off into a difference amplifier 14 from the amplified thermocouple signal at the output of the first pre-amplifier. The output signal, that has been temperature-compensated in this way, from the difference amplifier 14 is fed into the electronic control unit ECU 15 for further processing where, for example, it can be used for controlling or regulating baking processes, boiling processes or heating processes. After calibration, each sensor module exhibits reproducible signal characteristics within certain tolerances, whereby the signal characteristics can be processed by the ECU 15. Measurements of the surface temperature of a black body radiator of constant temperature with a sensor module in accordance with the invention have resulted in the feature that the result of the measurement changes only by ±2° C. while the ambient temperature of the module was increased from 10° to 90° C. Compensation of the total apparatus can thus be dispensed with on taking it into service. Likewise, in the case of repair work, a defective module can be exchanged without calibrating the device. As a result, a significant simplification of the servicing of the device is possible. The response rate of the sensor is also very high so that a rapid temperature change on the surface of the object, that is being measured, can be registered in fractions of a second and incipient burning of the articles, that are being baked, can be prevented by the immediate switching off of the device.

Figure 2:
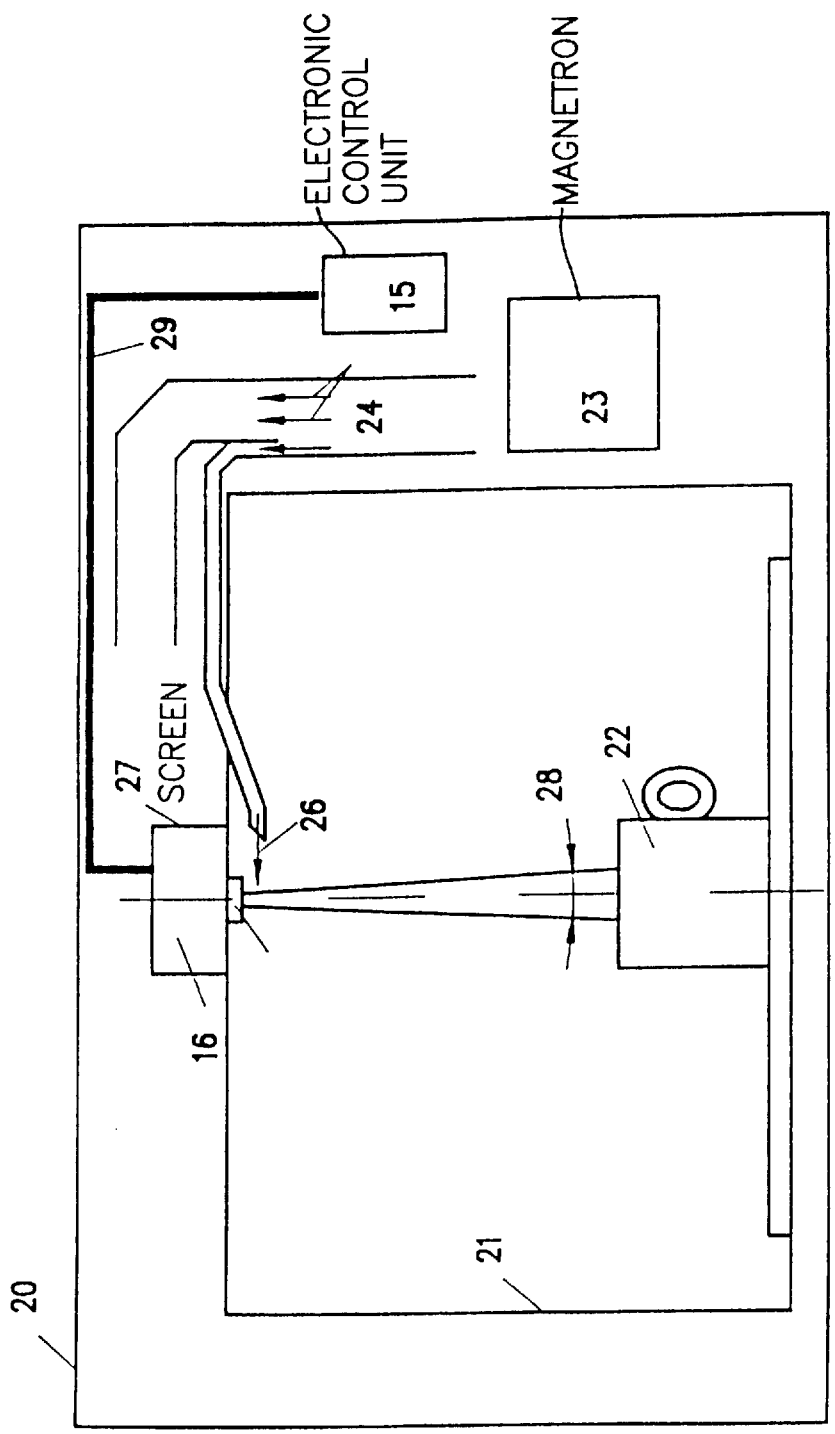
FIG. 2 shows the assembly of the sensor module in a microwave oven in a schematic, sectional form.

FIG. 2 shows a sensor module in accordance with the invention that has been incorporated into a microwave oven. The element 16 is built into the intermediate zone between the inner housing wall 21 and the outer wall 20 of the microwave oven device and can also be shielded off, if required, from interference, that emanates from the microwave device, by means of a metallic screen 27. Infrared radiation from the object 22, that is to be heated, gets into the element 16 through the filter F2 that is transparent to infrared and that is inserted in the intermediate wall 21. Thereby, the edges of the filter F2 are connected to the inner wall of the microwave oven in an electrically conducting manner. The temperature-compensated output signal from the element 16, that corresponds to the output signal from the difference amplifier 14, is led via an optionally shielded cable 29 to the ECU 15 control unit that is arranged at a certain separation from the element 16 in the device 20. There, the temperature-compensated output signal, that reproduces the surface temperature of the article that is being cooked, can be compared with a target value after which, for example, switching off of the magnetron 23 of the microwave oven takes place. If the signal is read via analog/digital conversion into a processor, then the cooking process can be controlled in several stages (e.g. in cycles or via a reduction in the magnetron output after reaching a certain surface temperature and switching off after reaching the final temperature).

Figure 3:
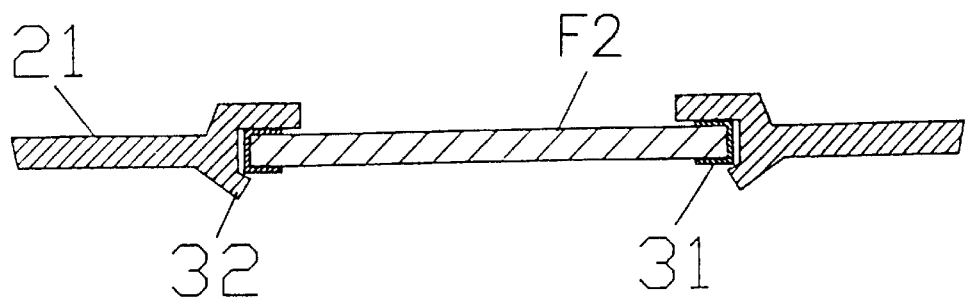
FIG. 3 shows the arrangement of the filter disk at the inner wall of a microwave oven in accordance with a first form of embodiment.

Soiling of the second filter F2 is prevented by way of the feature that part of the stream of cooling air 24 from the magnetron cooling unit is led through a by-pass directly in front of the filter F2. FIG. 2 shows the branched air stream 26. However, if the sensor filter becomes soiled after extended or improper use (e.g. by splashes from the article that is being cooked), then the filter disk F2 can readily be cleaned by the operator himself/herself. Soiling of the parabolic mirror optical system or of the detector input filter F1, that cannot be cleaned competently by the user, is in any case prevented. The opening angle 28 of the infrared beam of rays, that is evaluated by the sensor module, can be restricted to a few degrees by the proposed parabolic mirror optical system so that accurate localization results on the article that is being cooked. This is especially important since the amounts of radiation that are detected from the surroundings can significantly falsify the result of the measurement. In addition, the small opening angle also permits the evaluation of small objects that are to be measured. If, during usage in the microwave oven, one starts out exclusively from objects, that are to be measured, that have a large surface area, then the sensor module can also be arranged at the side walls of the microwave housing. In this case, the beam of rays is not directed vertically but, rather, obliquely onto the article that is being cooked. The installation of the filter F2 in the inner wall 21 of the housing is described in more detail in FIGS. 3 and 4 that show two different forms of embodiment. Thus, in accordance with the form of embodiment that is shown in FIG. 3, the filter disk F2 is held in a metal frame 31 and is engaged in a recessed depression in the metal, inner wall by means of a connection 32 that permits clicking into position.

Figure 4:
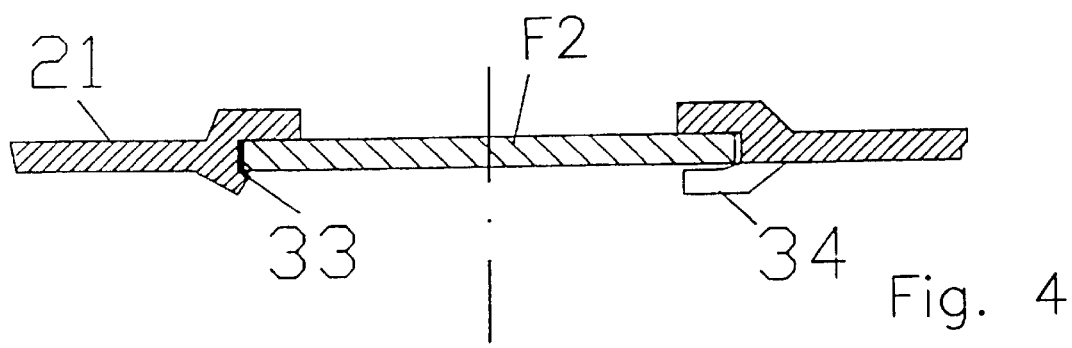
FIG. 4 shows the attachment of a filter disk at the inner wall of a microwave oven in accordance with a second form of embodiment.
Figure 5:
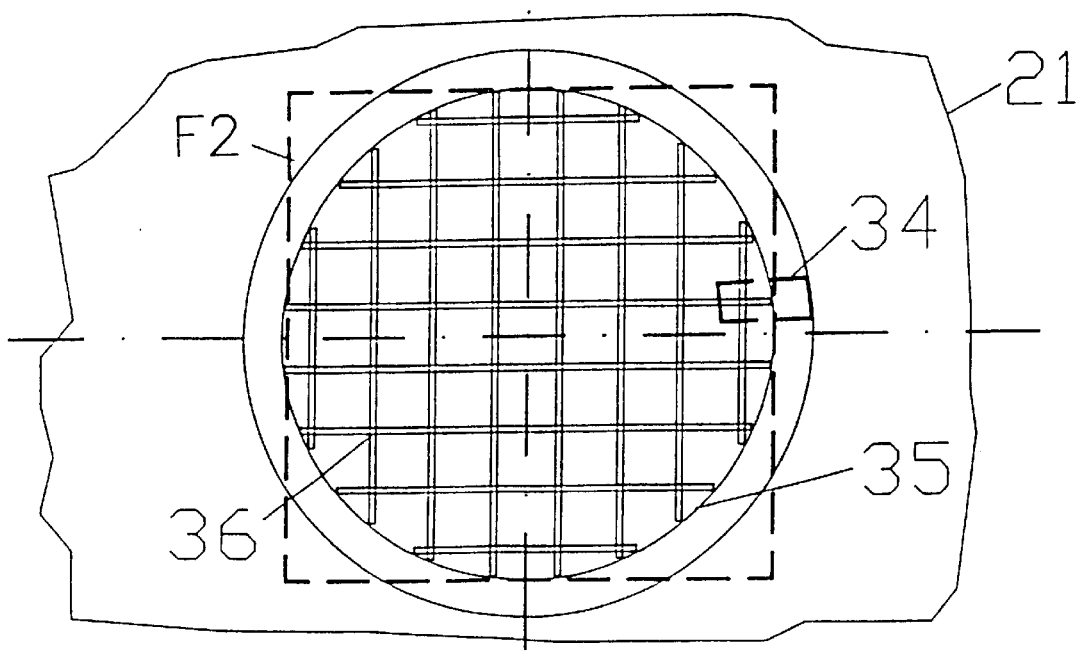
FIG. 5 shows a construction of filter disk with a metallic grid.

FIG. 4 shows the holding of the filter disk F2 by means of an adhesive bond 33 or by the application of a flexible strap 34. In order to reduce the flowing in of microwave radiation from the cooking zone through the opening 35 (FIG. 5) of the intermediate wall and into the sensor module, it is advantageous to manufacture the filter from an electrically conductive material (e.g. Si or Ge) and to connect it to the intermediate wall in an electrically conducting manner. The adhesive 33 must then be electrically conductive too or, as the case may be, it must achieve stable contact by means of springy flexible straps. In addition, the flowing in of microwave radiation can also be achieved by a grid 36 (FIG. 5), that comprises thin metallic conductive pathways, that is placed on the filter and connect to the inner wall of the microwave oven in an electrically conducing manner. These conductive pathways can be achieved inexpensively by means of an evaporation process on one large disk for many filters at the same time. If the sensor module is used in devices where soiling of the parabolic mirror optical system or, as the case may be, the sensor filter F1 is ruled out, then one can dispense with the filter F2.

We claim:

1. Sensor module comprising a concave mirror having a focal point, and a sensor element located at the focal point, the sensor element producing an output signal, wherein the sensor element comprises a thermopile and a temperature reference element located in the immediate vicinity of the thermopile so that the thermopile and the temperature reference element are illuminated by the same radiation reflected from the concave mirror, the thermopile and the temperature reference element producing respective output signals, wherein the output signal of the sensor element is to be transformed into a temperature signal in an evaluation circuit; wherein the sensor module further comprises a first pre-amplifier, that is capable of being calibrated for amplifying the output signal from the thermopile;

a second pre-amplifier amplifying the output signal from the temperature reference element; and a third pre-amplifier connected between output terminals of the first and the second pre-amplifiers to serve as a difference amplifier to form a difference in signal between output signals of the first pre-amplifier and the second pre-amplifier, an output signal of the third pre-amplifier serving as the output signal of the sensor element.

2. Sensor module in accordance with claim 1, further comprising a first infrared filter with a first optical transmission band and located in a path of rays of radiation incident upon the sensor element from an object under observation by the sensor module.

3. Sensor module in accordance with claim 2, further comprising a second infrared filter located between the concave mirror and the object, wherein an optical transmission band of the second infrared filter is larger than the optical transmission band of the first infrared filter.

4. Sensor module in accordance with claim 3 for use in a microwave oven energized by a magnetron cooled by a main stream of air flow, the oven being constructed with an inner wall and an outer wall, the inner wall defining an inner zone of the oven, wherein the thermopile, the first infrared filter, the temperature reference element, the concave mirror and the pre-amplifiers are located in an intermediate zone between the inner wall and the outer wall of the microwave oven, whereas the second filter is located in an opening of the inner wall, and wherein a partial stream of the air flow is diverted from the main stream, in the form of a by-pass into the inner zone of the oven through an opening in the inner wall in front of the second infrared filter whereby the partial stream flows past the second infrared filter.

5. Sensor module in accordance with claim 4, wherein the second infrared filter consists of an electrically conducting material and the edges of the filter are connected to the inner wall of the microwave oven in an electrically conductive manner.

6. Sensor module in accordance with claim 5 wherein the electrically conducting material of the second infrared filter is silicon.

7. Sensor module in accordance with claim 4 wherein the second infrared filter is over-coated with a grid of thin metallic conducting pathways that are connected to the inner wall of the microwave oven in an electrically conducting manner.

8. Sensor module in accordance with claim 1, wherein the concave mirror is a parabolic mirror wherein rays of radiation from an object under observation are reflected from the mirror to the focal point in a converging cone of rays having a solid angle of 90 degrees.

9. Sensor module in accordance with claim 1, wherein the thermopile and the temperature reference element are arranged in a common housing of the sensor element.

10. Sensor module in accordance with claim 1, wherein the temperature reference element is a thermistor.

11. Sensor module in accordance with claim 1, wherein the first and the second pre-amplifiers are arranged together on a housing of the sensor element.

* * * * *